United States Patent
Abe

[15] 3,644,973
[45] Feb. 29, 1972

[54] METHOD OF MAKING BALL STUDS FROM METAL RODS

[72] Inventor: Michio Abe, Kasugai, Japan
[73] Assignee: Tokai Cold Forming Co. Ltd.
[22] Filed: Apr. 7, 1970
[21] Appl. No.: 26,202

Related U.S. Application Data

[63] Continuation-in-part of Ser. No. 715,207, Mar. 22, 1968, Pat. No. 3,553,826.

[30] Foreign Application Priority Data

Aug. 16, 1967 Japan....................................42/52199

[52] U.S. Cl...............................29/149.5 B, 29/421, 29/424, 29/441
[51] Int. Cl................B21d 53/10, B23p 11/00, B23p 17/00
[58] Field of Search.....................29/149.5 B, 424, 441, 421; 72/256

[56] References Cited

UNITED STATES PATENTS

| 3,036,367 | 5/1962 | Ricks | 29/441 X |
| 3,255,623 | 6/1966 | Ricks | 72/256 |
| 3,553,826 | 1/1971 | Abe | 29/527.2 |

Primary Examiner—Thomas H. Eager
Attorney—Otto John Munz

[57] ABSTRACT

A method of making a ball stud from a metal rod, comprising the steps of cutting from the metal rod, a blank having generally the same volume and outer diameter as that of a finished ball stud, forwardly extruding one end of the blank positioned within a die cavity to form a taper, stem and shank portions, forming a preliminary cylindrical shape with a shallow cavity on the other end of the blank, the diameter of said preliminary cylindrical portion being smaller than the outer diameter of a finished spherical head, backwardly extruding the other end to form a preliminary cylindrical shape having a wall of generally the same thickness as that of a finished spherical head portion, and upsetting the preliminary cylindrical shape to form a spherical hollow head portion in the die cavity, whereby the upsetting operation is achieved with an application of a mixture of oil and air to pressurize the inner space of the spherical hollow head portion.

4 Claims, 15 Drawing Figures

Patented Feb. 29, 1972

INVENTOR
MICHIO ABE

BY *Otto John Munz*
ATTORNEY

INVENTOR
MICHIO ABE

BY
ATTORNEY

Patented Feb. 29, 1972 3,644,973

INVENTOR
MICHIO ABE

BY Otto John Munz
ATTORNEY

METHOD OF MAKING BALL STUDS FROM METAL RODS

This application is a continuation-in-part of my application Ser. No. 715,207, filed Mar. 22, 1968, now U.S. Pat. No. 3,553,826, granted Jan. 12, 1971.

This invention relates generally to new and useful improvements in the method of making a ball stud from a metal rod. More specifically, the present invention relates to an improved method which utilizes less forming pressure than previously required and which also produces a ball stud possessing characteristics superior to prior ball studs.

In accordance with the teaching of the present invention, the final outside diameter of the spherical head of the ball stud is substantially larger than the outside diameter of the preliminary cylindrical portion that is used in the upset operation. In contradistinction, the final outside diameter of the prior art head has substantially the same diameter as said preliminary cylindrical portion. The prior art patents which exemplify the disclosure of this feature are U.S. Pats. issued to Bernard E. Ricks; namely, Nos. 3,036,366; 3,036,367; and 3,255,623, in FIG. 3, FIG. 3, and FIG. 4, respectively.

For the purpose of stating the other advantages that flow from the principles of the invention disclosed herein, and also of the disadvantages that exist in the prior art, especially from the disclosures of the above-mentioned three Ricks patents, the following comparison remarks are herein set forth.

In accordance with the principles of the present invention, the pressing ratio as disclosed herein is substantially smaller than those of the Ricks patents. The pressing ratio is defined as the ratio of the diameter of the head after pressing with respect to the diameter of a blank portion prior to its becoming the head portion. Thus, the pressure required in the present invention is smaller, the required amount of work-hardening for forming the head portion is less, and the succeeding work can be performed more easily.

Therefore, it follows that during the step of backward extrusion, a pressure force of a larger magnitude is required in the Ricks disclosure because, as mentioned above, the pressing ratio will be greater. As a result thereof, where a very hard portion is to be backwardly extruded, it must be accomplished by the prior art devices with the use of a larger diameter punch.

Another feature of the method of the present invention is the formation of a preliminary head portion that has a wall thickness which is substantially the same as that in a finished spherical ball head. A work-hardening of a relatively small magnitude is thence required for the backward extrusion operation with such a preliminary head portion. Also a punch of relatively small diameter would be needed for the backward extrusion function. Further, a relatively small pressing force would be demanded in such an operation.

It is disclosed in the Ricks patents that the inner diameter of the cylindrical head that is obtained by the backward extrusion step is equal to that found in the finished ball head, and thus, the working heads of the references are larger than that of the one of the present invention. Since the magnitude of the work-hardness is necessarily higher in the Ricks disclosures, it is more difficult to make any substantial reduction in the top hole diameter of the spherical ball head. Furthermore, there is a tendency for wrinkles or cranks to form around the top hole in the prior art devices.

Still further in the present invention, the inner and outer diameters of the preliminary head portion are smaller and thus the deformation from the cylindrical shape to the spherical shape is very easily achieved. Further, during the pressing operation in accordance with the teaching of the present invention, the middle portion of the cylindrical wall is expanded so as to coincide with the outer diameter of a finished ball head. In contradistinction, the Ricks patents do not achieve such an expansion. It is readily seen that it is possible to make the diameter of the top hole remarkably small because the inner diameter of the preliminary cylindrical head is smaller than that required in the Ricks disclosures.

Still further, in the Ricks patents, the ratio of the diameter of the spherical ball to the diameter of the blank (or of the ball stud shaft portion) is limited to approximately 1.8. However, the present invention can provide a spherical ball having an outer diameter which is 2.5 times as large as that of the blank. This may be achieved without using an inner pressure of an oil-air mixture. Moreover, by incorporating this mixture in the present invention, it is possible to obtain a spherical ball about 3 times as large.

Moreover, in the present invention, the thickness of the cylindrical cavity bottom wall between the cavity's deep end and the shaft of the ball stud is substantially equal to the cylindrical side walls that exist elsewhere in the cavity. Thus, a smooth variation in cross section from the shaft portion to the ball head is obtained. Consequently, the stress concentration under a load is effectively avoided by having a substantially uniform wall thickness for the entire spherical ball. Also, this makes it possible to easily cold-form a completely spherical ball by performing a roller burnishing process after the completion of the pressing operation. In the Ricks patents, the cavity extends only approximately half of the distance of the ball head, so that the foregoing characteristics of the present invention cannot be attained.

Other objects and advantages of this invention will further become apparent hereinafter and from the drawings.

DESCRIPTION OF THE PREFERRED EMBODIMENT

Figure 1:
FIG. 1 is a plan view of the blank from which ball stud is formed in cut state.

Although specific forms of the invention have been selected for illustration in the drawings, and the following description is drawn in specific terms for the purpose of describing those forms of the invention, this description is not intended to limit the scope of the invention, which is defined in the claims.

Figure 2:
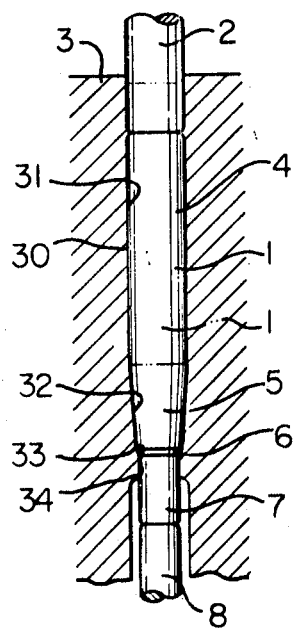
FIG. 2 is a sectional view of the first forming die showing the blank disposed in the cavity of the die by the first punch in accordance with the present invention.

Referring now to the drawings, particularly to FIG. 1, which shows a blank from which a finished ball stud may be formed, the blank 1 is a typical blank which has the same volume as the finished ball stud and the same diameter in cross section as the finished ball stud, which blank 1 is cut as desired at the first step in the present process by a multistage transfer press (not shown) from a cylindrical steel coil or rod (not shown) This blank 1 is then moved or located at the second step to the front of the first forwardly extruding die 3 (FIG. 2) by means of a transfer feed (not shown) and it is disposed adjacent and in alignment with the first die 3 as shown in FIG. 2, which is a sectional view of the first forming die showing the blank pressed into the cavity of the die 3 by the first punch 2. The die 3 has the internal cavity therewithin designated in its entirety by numerals 30, 31, 32, 33, and 34 corresponding to the outer shape essentially of the ball stud, with the exception of the ultimate head portion thereof. The blank 1 is fed into the cavity in the die 3 at the cylindrical portion 31 so as to provide the shank 4 of the ball stud therein by pressing with the punch 2 when the punch 2 moves axially toward the cavity of the die 3 driven by the crank (not shown) of the transfer press. As the punch 2 further moves into the cavity of the die 3 pressing the blank 1 along with the cavity, the blank 1 is reduced of its diameter at the respective tapered section 32 and beveled portion 33 within the cavity 30 so as to provide the respective tapered portion 5 and beveled shoulder 6 thereat, and is then forwardly extruded upon further forwarding of the punch 2 at the section 34 of relatively uniform diameter so as to provide the stem 7 of the ball stud at its one end at which a thread (not shown) may be formed over a predetermined length.

In this second step, as was described previously, it uses the blank having the same diameter as the largest diameter of the tapered portion equal to that of the shank of the finished ball stud, thereby the blank is possible to be extruded forwardly more than fifty percent at both the tapered and beveled portions and stem portion at the same time as will be hereinafter described in Table 1.

Figure 3:
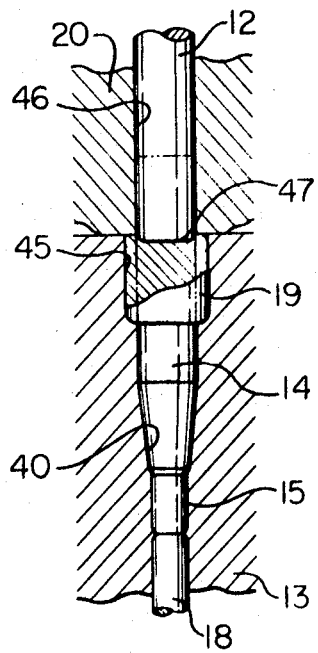
FIG. 3 is a sectional view of the second die showing a relatively shallow concave head cavity thereof provided by the third step prior to further shaping the head and cavity therein by the punch.

Upon completion of the second step as shown in FIG. 2, the blank 1 is pushed out from the cavity of the first die 3 by means of a knockout pin 8 to the front of the die 3 and at the same time it is gripped by the transfer feed (not shown) and is transferred to the front of the second die 13 (FIG. 3).

Referring now to FIG. 3, which is a sectional view of the second die 13 showing a relatively shallow concave head cavity 40 thereof as provided by the third step prior to further shaping the head and cavity therein by the punch 12, the third step presses it so as to form the first preliminary or partial shape of a spherical head by proceeding the punch 12 into the cavity 47 of the blank 1. The second die 13 has almost the same cavity corresponding to the shank, tapered and beveled portions and stem of the finished ball stud at the lower portion, and at its upper portion has a cavity 45 of a smaller diameter than the outer diameter of the finished spherical head. Cooperating with the die 13, a sleeve member 20 is provided on the die 13 having an axial bore 46 therein corresponding in diameter to the outer diameter of the punch 12 movable therewithin. The second punch 12 moves axially toward the die 13 to extrude the blank 1 until it reaches a knockout pin 18 at its lower end. Further as the punch 12 moves into the head of the blank 1, it moves radially and axially into the recess or cavity 45 to form a partially completed shape of its head as shown in FIG. 3. At the uppermost portion of the head of the blank 1 is formed the shallow recess or cavity 47 produced during continued axial travel of the punch 12 so as to assume the next step to extrude further therein, at the same time it is upset until at the opposite end of the die cavity 40 it reaches a knockout pin 18 and is formed on the surfaces conforming essentially to the stem, taper and beveled portions and shank of the finished or smooth curved surface.

Figure 4:
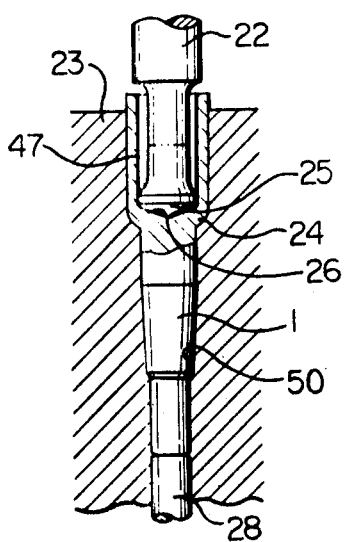
FIG. 4 is a sectional view of the third die showing shape to be formed from that in FIG. 3 prior to further formation of the stud head portion.

The blank 1 formed at the third step as was described is projected forwards from the cavity of the die 13 by a knockout pin 18 and is transferred by the transfer feed (not shown) to the front of third die 23 (FIG. 4).

Referring now to FIG. 4, which is a sectional view of the third die showing shape to be formed from that in FIG. 3 prior to further formation of the stud head portion, the fourth step is to extrude backwards the preliminary shape of the spherical head of the ball stud. The third punch 22 for backwards extruding moves axially into the cavity 47 of the previously formed blank of the third die 23 so as to press the blank until it reaches a knockout pin 28. The shape of the cavity 50 of the third die 23 is almost the same as the second cavity 40 of the second die 13. The diameter of the third punch 22 is predetermined such that when it extrudes backwards into the cavity 47 of the preliminary head, the head wall may be formed generally the same thickness as the finished head of the ball stud. The third punch is pressed into the cavity 47 of the head of the blank 1 until the bottom wall 24 of the head is formed generally the same thickness as that of the finished head of the ball stud or of the cylindrical side wall of the head of the blank 1, and this step is completed.

Figure 5:
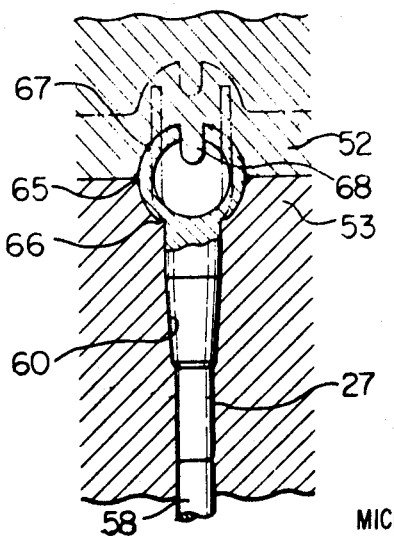
FIG. 5 is a sectional view of the fourth die showing the final forming of the head portion.

The blank 1 formed at the fourth step is projected forwards from the cavity 50 of the die 23 by a knockout pin 28 and is transferred by the transfer feed (not shown) to the front of fourth die 53 (FIG. 5.).

In FIG. 5, which is a sectional view of the fourth die showing the final forming of the head portion, in the fifth step the blank 1 is pressed into a cavity 60 of the fourth die 53 by the fourth punch 52 until it reaches a knockout pin 58. The shape of the lower cavity 60 of the fourth die 53 is almost the same as the third cavity 50 of the third die 23, but that of the upper cavity thereof has a semispherical cavity portion 65 and a shoulder portion 66 at the lower end of the spherical cavity portion corresponding to those of the finished head of the ball stud so as to form a predetermined head of the finished ball stud. The fourth punch 52 has also a semispherical cavity portion 67 with a projection 68 at the upper center of the cavity. The diameters of both the fifth die and punch are approximately the same as that of the finished spherical head of the ball stud, but in order to remove a springback thereof upon the completion of the press of the spherical head portion and at the pressing to perform trimming or prevent from making trim between the die 53 and punch 52, the radius of adjacent the bottom of the spherical head is made 2 to 10 percent larger than that of the finished head of the ball stud. As the fourth punch 52 moves axially toward the die 53, the upper half portion of the cylindrical head portion or wall performed at the fourth step is reduced gradually along with the surface of the semispherical cavity portion 67 of the fourth punch 52 and the diameter of the upper opening of the cylindrical head is gradually reduced and at last the upper end of the cylindrical head reaches the projection 68 on the cavity surface of the punch 52. Further, the central portion of the cylindrical head is expanded outwards at its periphery by means of the compression as the punch 52 moves toward the die 53 so as to form the final shape of the hollow spherical head of the ball stud.

As a consequence of forming substantially uniform wall thickness for the entire spherical ball in accordance with the techniques of the present invention, it then becomes possible to easily cold-form a completely spherical ball by performing a roller burnishing process after the completion of the pressing operation.

It is to be especially noted that the final outside diameter of the spherical head of the ball stud that results from the above techniques is substantially larger than the outside diameter of the preliminary cylindrical portion that is used in the upset operation. Further, the pressing ratio is relatively reduced. Also, magnitude of work-hardening is relatively reduced. Still further, the remainder of the working operations are relatively reduced.

The cavity of the cylindrical head may be filled with a sprayed lubricant just prior to receiving the punch 52 by feeding a pressurized jet or spray of the lubricant into the cavity 68. Almost at the same time when in this step the punch 52 reaches the end of the cylindrical wall of the head, the sprayed lubricant with air filled in the cavity of the blank 1 is enclosed therein. As the punch 52 moves toward the die 53 the volume of inside the cavity decreases with increasing the inner pressure of the mixture of the lubricant and air, which pressure effects to operate to form the spherical head from the cylindrical shape.

In FIGS. 6 to 9, which show another process of the present invention as its embodiment, this process is essentially effective to the hollow spherical head ball stud having relatively larger spherical head portion to the diameter of its shaft or shank.

This process extrudes the blank forward and backward at the same time, that is, it works to extrude specially the blank and at the same time to press it so as to expand it in several steps in combination and in succession to minimize the power for each step and to make mass production.

Figure 6:
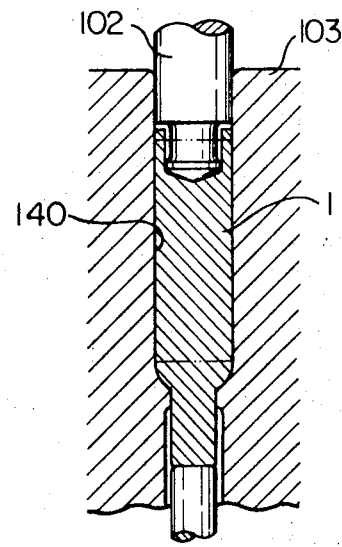
FIGS. 6 to 9 show another process of the present invention as its embodiment.

Referring now to FIG. 6, which is a sectional view similar to FIG. 4 showing the second step of this process, in this second step the first die 103 receives at first a blank 1 cut at the first step in a predetermined length in its cavity 140 as illustrated by dot and dash lines in FIG. 6, which cavity has the same diameter as the blank 1 and has a preliminary shape of a stem of the ball stud therein. Then the first punch 102 moves axially toward the die 103 to forwardly extrude the blank 1 so as to form the preliminary shape of the stem at one end and at the same time to backwardly extrude it so as to form the first preliminary shape of the spherical head of the ball stud so as to form a cylindrical hollow shape at the other end.

Figure 7:
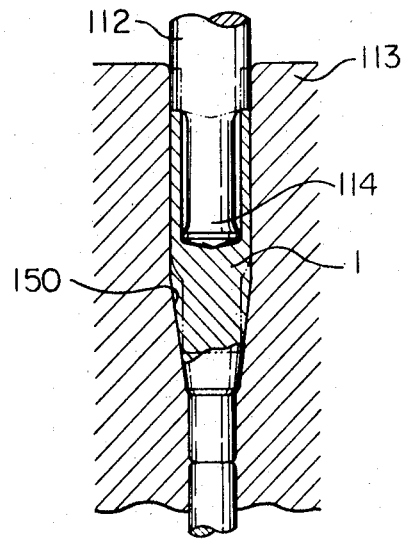

Referring now to FIG. 7, which is a sectional view similar to FIG. 6 showing the third step of this process, the blank 1 from the second step is fed into the cavity 150 of the second die 113 as designated by dot and dash lines in FIG. 7. Then, the second punch 112 having a longer projection 114 moves axially into the cavity 150 so as to form the second preliminary shape or hollow cylindrical shape of the head of the ball stud by upsetting the blank 1 in the cavity 150 and pressing it thereby in order to forwardly extrude at one end the blank 1 to form the taper portion of the ball stud and to backwardly extrude at the other end it to form the second preliminary cylindrical shape of the spherical head of the ball stud, which makes the blank 1 as a whole longer than that formed in the second step.

Figure 8:
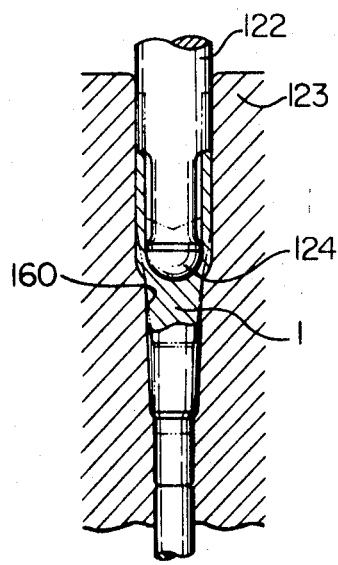

Referring now to FIG. 8, which is a sectional view similar to FIG. 7 showing the fourth step of this process, the blank 1 from the third step is transferred into the cavity 160 of the third die 123 as indicated by dot and dash lines in FIG. 8. The third punch 122 having a still longer projection 124 which has semispherical end moves axially into the cavity 160 so as to form the third preliminary shape or still longer hollow cylindrical shape of the head of the ball stud and at the same time to forwardly extrude the blank 1 still further at the stem, taper and shank portion.

Figure 9:
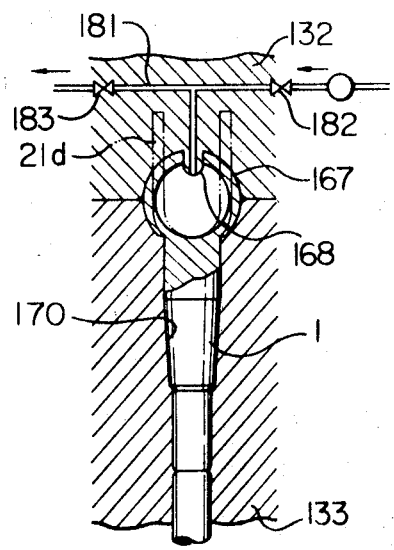

Referring now to FIG. 9, which is a sectional view similar to FIG. 8 except having oil holes in the punch, showing the fifth step of this process, the blank 1 from the fourth step is fed into the cavity 170 of the fourth die 133 as illustrated by dot and dash lines in FIG. 9. In this step, when the punch 132 moves toward the die, the top end of the cylindrical shape of the head of the blank 1 is reduced and the center to bottom portion thereof is expanded so as to finally form the spherical head of the ball stud along with the spherical cavity 167 provided on the bottom of the punch 132.

In this particular step, the punch 132 has oil hole 181, check valve 182 and pressure regulating valve 183, and during this step spray oil is fed into the hollow cavity of the head of the ball stud along with the spherical cavity 167 provided on the bottom of the punch 132.

In this particular step, the punch 132 has oil hole 181, check valve 182 and pressure regulating valve 183, and during this step spray oil is fed into the hollow cavity of the head of the blank 1 through the check valve 182 and oil hole 181 so as to pressurize the inner space thereof with the mixture of oil and air, at the same time the check valve 182 and oil hole 181 so as to pressurize the inner space thereof with the mixture of oil and air, at the same time the check valve 182 prevents the pressurized mixture from flowing back therethrough and the pressure regulating valve 183 adjust the inner pressure at a predetermined value by exhausting the excess oil and maintains the predetermined pressure therein of the mixture to seal it in the cavity of the blank in order to avoid the inward buckling of the cylindrical wall of the head of the blank 1 when it is pressed by the punch 132.

According to this step, since the working rate is smaller than the conventional method in backwardly extruded cylindrical portion, the deformation from the cylindrical shape to the spherical shape is very easily done, thereby enabling the diameter of the hole on the top of the spherical head to make it extremely small.

In these steps since the deforming resistance of the blank is small, the method of making ball stud is improved and it is effected to make larger ball stud economically in greater production.

The experimental data in making a ball stud in accordance with the present invention will now be shown in the following Table 1 in comparison with the conventional method of making ball stud by using chromemolybdenum steel.

TABLE 1

| Diameter of blank | First embodiment, 15.2 mm. | Second embodiment, 13 mm. | Conventional method 11 mm. |
|---|---|---|---|
| Cross-sectional contraction percentage in the second step. | 48% (forwardly extruding 81 kg./mm.²). | 62% (forwardly extruding 82.5 kg./mm.²); 66% (backwardly extruding 83.0 kg./mm.²). | |
| The third step: | | | |
| Pressing ratio | 3.1 (difficult) | | Approximately 8 (extremely difficult). |
| Pressing rate | 50% | | 80%. |
| Cross-sectional Contraction rate | | 48% (forwardly extruding). 66% (backwardly extruding). | |
| Deforming resistance | 85–88 kg./mm.² | 80–84 kg./mm.² | 95–110 kg./mm.². |
| The fourth step: | | | |
| Cross sectional Contraction, percentage | 47% (backwardly extruding) | 50% (forwardly extruding) 60% (backwardly extruding). | 80% (backwardly extruding). |
| Deforming resistance | 90–95 kg./mm.² | 80–85 kg./mm.² | 100–120 kg./mm.² |
| The fifth step: Pressing spherical portion | 90–95 kg./mm.² | 85–90 kg./mm.² | 100–120 kg./mm.² |

In making the ball stud in accordance with the present invention, as the deformation resistance in each step is small, the required power is less than the conventional method, and further upsetting and pressing work in the present method is very easy, thereby the work hardening of the blank in the step is less than the conventional method and less producing the trim between the punch and die, and can maintain to provide accurate dimension of the spherical head on the finished products and can also maintain to have an excellent material flow in the deformed portion of the ball stud. Furthermore, the durability for the repetitive stress thereof is very increased thereby and the present process provides stronger ball stud than the conventional one by making the top hole of the spherical head of the ball stud very small.

Further, a comparison of experimental data in making a ball stud and especially the making of the spherical head portion in accordance with the teachings of the prior art and the present invention will now be shown in conjunction with FIGS. 10–12 and FIGS. 13–15, respectively, of the drawings. In the prior art experiment, a blank (not shown) was cut from a coil stock having a diameter of 15.9 and a length of 103 (dimensional units omitted). In the experiment with respect to the present invention, a blank (not shown) having the same diameter and length of 88 was selected.

Figure 10:
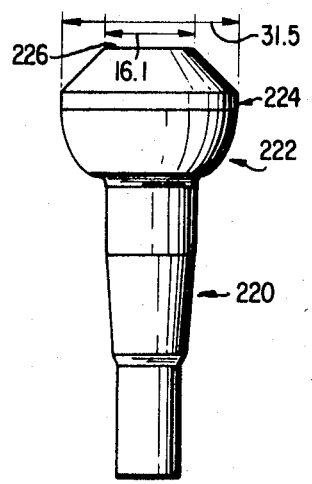
FIG. 10 is a plan view of the stud blank similar to the FIG. 3 showing, but in accordance with the prior art.

The prior art blank 220 as illustrated in FIG. 10 has reached substantially the third step of FIG. 3, but without any showing of a cavity in the head 222. Said head has an outer diameter at section 224 of 31.5 and an end face diameter of 16.1 at section 226. Likewise, the blank 320 of the present invention as illustrated in FIG. 13 has a head 322 having an outer diameter at section 324 of 26.6 and an end face diameter of 16.1 at section 326.

Figure 11:
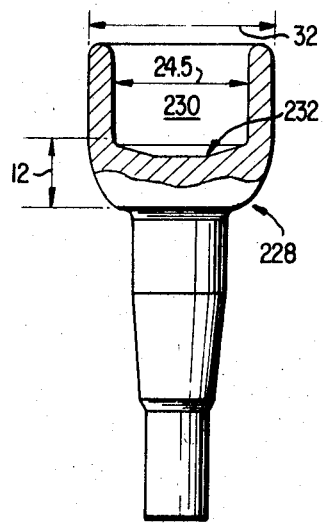
FIG. 11 is a plan view, partially in section in the head portion of the stud blank similar to the FIG. 4 showing, but in accordance with the prior art.

The head 228 of FIG. 11 which is substantially equivalent to the fourth step showing in FIG. 4, has a rectangular-shaped cavity 230 having an outer diameter of 32 and an inner diameter of 24.5. The cavity 330 of the head 328 in FIG. 14 has an outer diameter of 26.7 and an inner diameter of 20.2. Furthermore, in the prior art embodiment of FIG. 11, the thickness of the bottom wall 232 is approximately 8.5, while the present embodiment of FIG. 14 has a bottom wall 332 having a thickness of approximately 4, which dimension is about one-half of the prior art disclosure.

Figure 12:
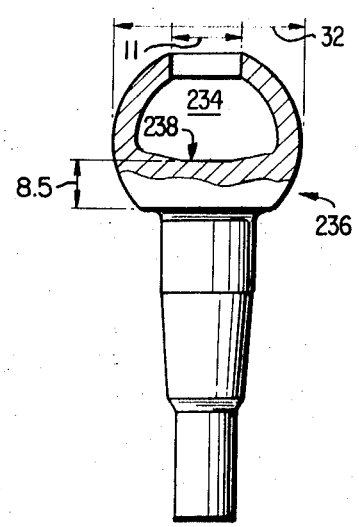
FIG. 12 is a plan view, partially in section in the head portion of the stud blank similar to the FIG. 5 showing, but in accordance with the prior art.

FIG. 12 which is substantially equivalent to the final forming of the head portion in FIG. 5, has a spherical shaped cavity 234 of spherical head 236 having an outer diameter of 32 and a top hole diameter of 11. The bottom wall 238 of FIG. 12 has an approximate thickness of 8.5. In contradistinction, the bottom wall 338 of FIG. 15 has an approximate thickness of 4 and the end face has a diameter of 5 at section 334. As readily seen in FIG. 15, the spherical cavity wall has a uniform thickness including the bottom wall 338, while the spherical cavity wall of FIG. 12 is definitely not uniform in view of the larger thickness in the bottom wall 238.

Figure 13:
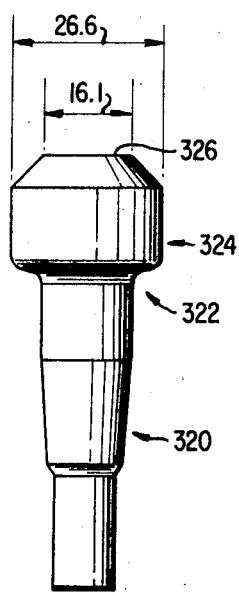
FIG. 13 is a plan view of the stud blank similar to the FIG. 3 showing in accordance with an example of the present invention.
Figure 14:
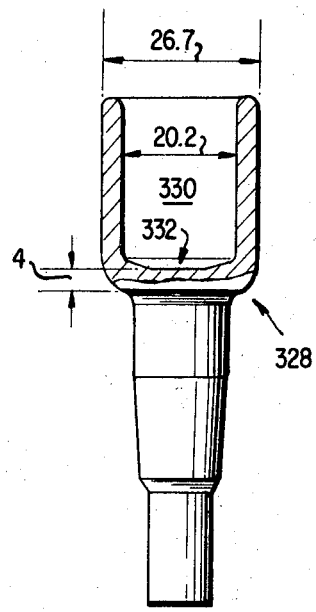
FIG. 14 is a plan view, partially in section in the head portion of the stud blank similar to the FIG. 4 showing in accordance with the example of the present invention.
Figure 15:
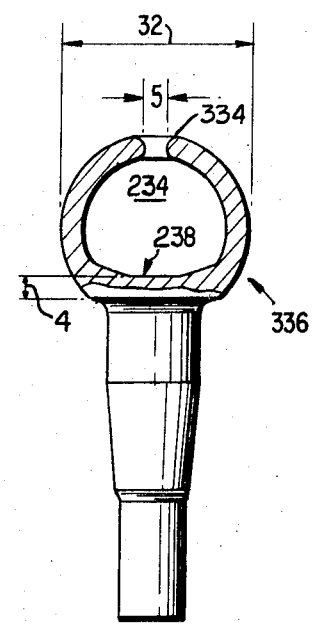
FIG. 15 is a plan view, partially in section in the head portion of the stud blank similar to the FIG. 5 showing in accordance with the example of the present invention.

Furthermore, the present invention embodiment as illustrated in FIGS. 13–15, clearly shows the diameter of 26.6 units for the preliminary cylindrical portion 322 to be smaller than the outer diameter of 32 units and the inner diameter of 5 units of the final spherical head 336. This is contrary to the teachings of the prior art embodiment as illustrated in FIGS. 10–12 which shows a diameter of 31.5 for the preliminary cylindrical portion 224 to be substantially equal to the outer diameter of 32 units of the final spherical head 236. Further, the spherical head 336 of the present invention has the relatively small top hole of 5 in diameter, this being in sharp contrast to the prior art head with the top hole of 11 in diameter.

Changes and modifications in the structure and method hereinbefore described will become apparent to those having skill in the art after having had reference to the foregoing description and drawings. However, it is not intended to limit the scope of the invention by the foregoing description and drawings, but by the scope of the appended claims in which the embodiments of the invention in which an exclusive property or privilege is claimed are defined as follows.

I claim:

1. A method of making a ball stud from a metal rod, comprising the steps of:
    1. cutting from said metal rod, a blank having generally the same volume and outer diameter as that of a finished ball stud,
    2. forwardly extruding one end of said blank positioned within a die cavity to form a taper, stem and shank portions,
    3. forming a preliminary cylindrical shape with a shallow cavity on the other end of said blank, the diameter of said preliminary cylindrical portion being smaller than the outer diameter of a finished spherical head,
    4. backwardly extruding said other end to form a preliminary cylindrical shape having a wall of generally the same thickness as that of a finished spherical head portion, and
    5. upsetting said preliminary cylindrical shape to form a spherical hollow head portion in the die cavity.

2. A method of making ball studs as specified in claim 1 wherein the upsetting operation comprises the step of applying a mixture of oil and air into the cavity of the head portion to pressurize the inner space of the spherical hollow head portion.

3. A method of making a ball stud from a metal rod, comprising the steps of:
    cutting from said metal rod a blank having generally the same volume and outer diameter as that of a finished ball stud,
    forwardly extruding one end of said blank positioned within a die cavity to form a taper, stem and shank portions,
    forming a preliminary cylindrical shape with a shallow cavity on the other end of said blank, the diameter of said preliminary cylindrical portion being smaller than the outer diameter of a finished spherical head,
    backwardly extruding said other end to form a preliminary hollow cylindrical shape having a smaller outer diameter than the outer diameter of a finished spherical head and a wall of generally the same thickness as that of a finished spherical head portion, and
    upsetting said preliminary cylindrical shape to form spherical hollow head portion in the die cavity through causing its central portion to expand outwardly.

4. A method of making a ball stud from a metal rod, comprising the steps of:
    cutting from said metal rod, a blank having generally the same volume and outer diameter as that of a finished ball stud,
    forwardly extruding one end of said blank positioned within a die cavity to form a taper, stem and shank portions,
    forming a preliminary cylindrical shape with a shallow cavity on the other end of said blank, the diameter of said preliminary cylindrical portion being smaller than the outer diameter of a finished spherical head,
    backwardly extruding said other end to form a preliminary cylindrical shape having a wall of generally the same thickness as that of a finished spherical head portion, and
    upsetting said preliminary cylindrical shape to form a spherical hollow head portion in the die cavity and to leave a relatively small top hole at the upper end of the finished spherical head.

* * * * *